Jan. 9, 1968   R. MICEK   3,362,915
METHOD OF AND APPARATUS FOR GENERATING SILVER IODIDE NUCLEI
Filed Feb. 24, 1965

INVENTOR.
RICHARD MICEK
BY
Van Valkenburgh & Loewe
ATTORNEYS

United States Patent Office 3,362,915
Patented Jan. 9, 1968

3,362,915
METHOD OF AND APPARATUS FOR GENERATING SILVER IODIDE NUCLEI
Richard Micek, Walsenburg, Colo. 81066; Frank Micek, administrator of said Richard Micek, deceased
Filed Feb. 24, 1965, Ser. No. 435,001
12 Claims. (Cl. 252—359)

This invention relates to a method of and apparatus for generating silver iodide nuclei, and particularly to a generator utilized in such apparatus and adapted to produce silver iodide nuclei which can be utilized for cloud seeding purposes, to produce a fall or an additional fall of rain or snow.

In cloud seeding operations, silver iodide nuclei are distributed into a cloud formation, so that each will act as a nucleus or center for the condensation of a drop of water or snowflake from the cloud, which will then fall, usually in the form of rain, but sometimes in the form of snow, depending upon the atmospheric temperature conditions. Cloud seeding operations have been carried out by spraying or otherwise distributing sub-microscopic silver iodide crystals into a cloud formation, from an airplane travelling through or adjacent to the cloud. Silver iodide powder has also been mixed with thermite and the thermite ignited and, at the same time, ejected from an airplane into a cloud formation. Such cloud seeding operations, involving the use of an airplane, are obviously quite expensive, so that cloud seeding operations, particularly on land, have often been carried out by vaporizing silver iodide in a heating apparatus and permitting air currents to carry the nuclei up into the cloud. Thus, coke has been impregnated with silver iodide dissolved in acetone, then the coke burned in a cabinet type structure. Also, silver iodide has been compressed into an electrode used as a terminal of an electric arc, while silver iodide has also been dissolved in acetone and the latter sprayed over a gas flame. Such operations have often not been as successful as desired, apparently because of the inefficiency of previous generators to produce an amount of nuclei corresponding to the amount of silver iodide vaporized.

The term "nuclei," as used herein, has no reference to the nucleus of an atom, but rather refers to those particles of silver iodide, apparently macromolecular in size, each of which is adapted to form a nucleus for the formation of a drop of water from a cloud formation. As far as is presently known, silver iodide appears to be the only compound having the property of attracting moisture to it, in such a way that water droplets can be produced by nuclei thereof in a cloud formation.

Among the objects of the present invention are to provide a novel method of and apparatus for generating silver iodide nuclei and a novel generator utilized therein; to provide such a method, apparatus and generator which is efficient and effective in operation; to provide such method, apparatus and generator which produces a greatly increased amount of silver iodide nuclei; and to provide such method, apparatus and generator which will cause the nuclei produced to be effectively carried to or toward a desired location.

Additional objects and the novel features of this invention will become apparent from the description which follows, taken in conjunction with the accompanying drawings, in which.

Figure 1:
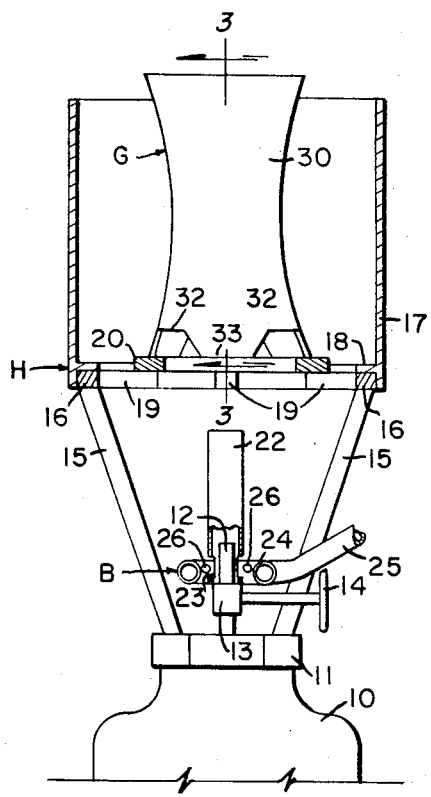
FIG. 1 is a vertical section of apparatus including a silver iodide nuclei generator, each constructed in accordance with this invention and the apparatus being particularly adapted to be mounted on top of a tank containing a fuel gas.

As illustrated in FIG. 1, a silver iodide nuclei generator G, constructed in accordance with this invention, is mounted in a housing and support H, over a burner assembly B, which is adapted to produce a flame of sufficient temperature which passes upwardly through the generator G. The burner assembly B is conveniently mounted upon a conventional tank 10 containing a fuel gas, such as propane or butane, including a threaded connection 11 adapted to be attached to the top of the tank, which is placed in upright position. A gas nozzle 12, through which the fuel gas flows in a small, regulated stream, is mounted atop a valve 13, in turn mounted upon and supported by the connection 11 and adjusted by a valve handle 14. The housing and support H is supported by a series of legs 15, such as three in number, the lower ends of which are attached to the connection 11 and the upper ends of which are attached to an outer ring 16. In turn, outer ring 16 supports a cylindrical housing wall 17, mounted in the ring in any suitable manner, as by an inwardly extending flange 18 adjacent the lower end thereof. A series of ribs 19, such as four in number, extend inwardly from outer ring 16 to a position beneath the lower periphery of the generator G, the inner ends of ribs 19 supporting an inner ring 20, on which the generator G rests. A mixture of fuel gas and air, or air enriched with oxygen, as in the manner described below, passes upwardly through a burner tube 22, with combustion of the fuel gas and air, or fuel gas and oxygen enriched air, beginning within or immediately above the upper end of burner tube 22. The lower end of burner tube 22 may be attached to the top of valve 13, or may be supported in any other suitable manner, while a series of circumferentially spaced, relatively wide slots 23 are formed in the lower end of burner tube 22. Air for combustion passes through slots 23, while additional oxygen, for enriching the air, may also pass through slots 23 from an oxygen tube 24, to which an oxygen supply tube 25 is connected, tube 24 having a series of relatively closely spaced holes 26 on the inside thereof. Oxygen tube 24 surrounds burner tube 22, opposite slots 23, and may be supported in that position by a weld or other attachment of oxygen supply tube 25 to one of the support legs 15. As will be evident, when additional oxygen is supplied through tube 24, the temperature of the flame produced by combustion of the fuel gas issuing from gas nozzle 12 is increased, perhaps several hundred degrees over the temperature of the flame produced by the combustion of the fuel gas with air alone.

Figure 2:
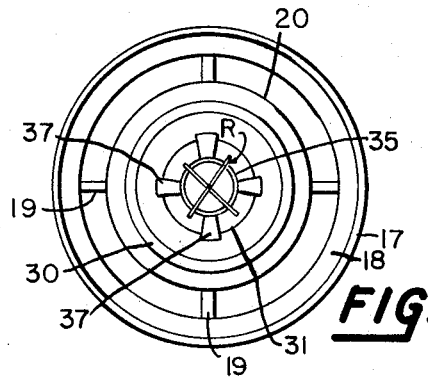
FIG. 2 is a top plan view of the apparatus of FIG. 1.
Figure 3:
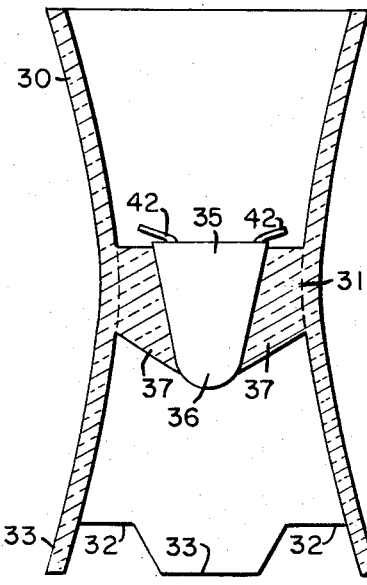
FIG. 3 is a vertical section, on an enlarged scale, of the silver iodide generator and taken along line 3—3 of FIG. 1.
Figure 4:
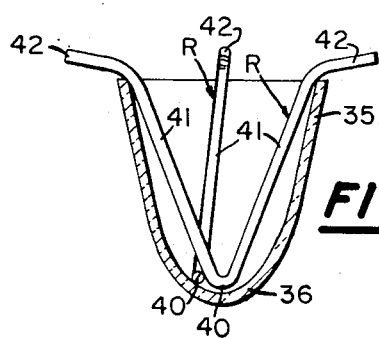
FIG. 4 is a vertical section, on a further enlarged scale, of a crucible and showing particularly the position of certain dual capillary rods therein.
Figure 5:
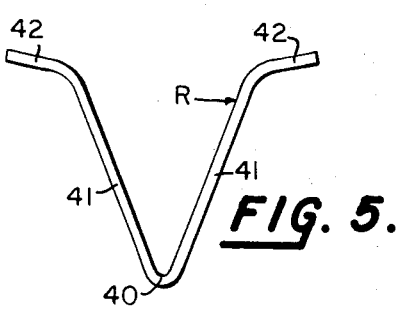
FIG. 5 is a side elevation of one of the dual capillary rods of FIG. 4.

In accordance with this invention, the generator G, as in FIGS. 2 and 3, includes an upright shell 30, formed of ceramic, fire clay, or other material suitable to withstand the temperatures involved. Shell 30 has a larger diameter at the top and bottom, the diameter decreasing from both the top and bottom to a minimum diameter at or about its midpoint 31, which is the center of a venturi section formed by the shell 30, for a purpose described later. The lower end of shell 30 is provided with a series of slots 32, forming legs 33 therebetween, which rest on the inner ring 20. A thimble shaped crucible 35, whose bottom 36 is preferably rounded, as shown, is supported inside the shell 30, adjacent the venturi center 31, by a series of lugs 37, such as four in number, as in FIG. 2. Lugs 37 may be formed integrally with shell 30 or may be formed separately and attached to the inside of the shell by a conventional ceramic adhesive. If desired, shell 30 may be formed from an upper half and a lower half, attached together by a conventional ceramic adhesive at the midpoint 31, as with the complete assembly then being baker or fired. The inner edges of the lugs 37 slope inwardly and downwardly to correspond with the sides of crucible 35, to hold the crucible accurately centered, and with the upper edge of the crucible slightly above the venturi center 31. A series of capillary rods, such as dual rods R, are placed in the crucible, as in FIGS. 4 and 5, each rod R having a round base 40, a pair of upwardly extending, laterally diverging legs 41 and an end 42 inclined outwardly from each leg 41. As in FIG. 4, a pair of dual rods R may be placed with the base 40 of one dual rod abutting the extreme lower end of a leg 41 of the other dual rod, so that the base 40 of each dual rod R is disposed as close to the bottom of the crucible as possible. The divergence and length of legs 41 is such that the ends 42 extend outwardly over the upper rim of the crucible 35 at a small angle, such as between 10° and 25°, the spaces between the upper ends of legs 41 corresponding to the inner diameter of the crucible at its upper edge. As shown, the ends 42 of rods R extend outwardly over the upper rim of the crucible 35 at positions spaced approximately equally around the crucible, preferably interspaced with the lugs 37, as in FIG. 2.

Figure 6:
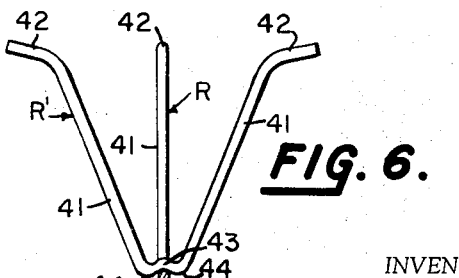
FIG. 6 is a vertical section, similar to a portion of FIG. 4, but showing a modification of one of the dual capillary rods.

In a modification of the capillary rods, shown in FIG. 6, one rod R may be similar to the rods previously described, but the other rod R' is provided with a sinuous base 43, the center of which extends over the base 40 of the rod R, with the lower points 44 of base 43 being in the extreme bottom of the crucible, on opposite sides of base 40 of rod R. Dual rod R' is otherwise similar to rod R, thus having upwardly diverging legs 41 and outwardly extending ends 42.

If desired, base 43 of rod R' may be welded or swaged onto base 40 of rod R, so that rods R and R' are attached together and may be placed in or removed from the crucible as a single unit. Also, one of rods R may instead comprise two rods, eaching having a leg 41 and 42, with the lower end of each leg 41 welded to the base 40 of a dual rod R, again to form a single unit having four legs and outwardly extending ends. As will be evident, three lugs 37 may be used with a three legged rod assembly constructed in a similar manner. Thus, the capillary rods will be referred to, at times in the appended claims, as a series of rods, it being understood that the lower ends of the rods in the bottom of the crucible, may be attached together, as in pairs, threes, fours, or the like. It will be noted that individual rods may also be used, with the lower end of each in the bottom of the crucible and the upper end of each overhanging the upper edge of the crucible, since the attachment of two or more rods together, at the lower ends, is more convenient, both for placement of the rods and in retaining the rods in position, against the effect of vibration, jarring or other movement of the apparatus. The length of ends 42 of the capillary rods R and R' are proportioned to extend outwardly, in a lateral direction from the rim of crucible 35, for a distance preferably greater than one-half the distance between the edge of the crucible and the inside of shell 30, but leaving sufficient clearance that placement of the capillary rods in the crucible, or placement of the crucible with the rods therein, is not inconvenienced by the inside of shell 30.

As will be evident from the previous description of the burner assembly B, a flame having a temperature of about 1750° F., i.e. propane and air, or 500° to 1000° higher with the addition of oxygen, moves in an upward direction from the upper end of burner tube 22 to enter the lower end of the shell 30, thereby heating the bottom 36 of crucible 35, and also passes upwardly between the lugs 37 to move past the extending ends 42 of the capillary rods R. The venturi construction of shell 30 concentrates the flames on the ends 42 of the capillary rods, so as to insure that the rod ends are subjected to as high a temperature as possible. For operation of the generator G as a silver iodide nuclei generator, a small amount of silver iodide, as in the form of powder, is placed in the bottom of crucible 35, which is then inserted between the lugs 37, while the capillary rods R may be placed in the crucible either before or after placement within the lugs 37. The heat produced by the flame will cause the silver iodide to melt and form a pool in the bottom 36 of the crucible. When one gram of silver iodide in powder form was placed in the bottom of a crucible having a diameter at the top of approximately 1½ inches and a height of approximately 1¾ inches, the one gram of silver iodide powder melted to form a button in the bottom of the crucible approximately the size of a conventional shirt button. The silver iodide may also be placed in the crucible in the form of a gelatin capsule, or in the form of a compressed pill. Since the ends 42 of the capillary rods R are exposed directly to the flame, the rods will be heated to a temperature corresponding to the temperature of the combustion gases at that point. By conduction, the remainder of the rods will be heated and the molten silver iodide will travel up the rods to the ends 42. The phenomenon by which such molten silver iodide travels up the rods has not been definitely established, although it is apparently similar to the well known phenomenon of capillary action; hence, the rods R and R' are termed capillary rods for convenience in indicating the apparent effect produced by them. In any event, when the crucible and rods were removed before the silver iodide was exhausted and the rods were permitted to cool, a thin but visible coating of silver iodide solidified on the rods. Thus, it was known that the molten silver iodide travelled up the rods R. As the molten silver iodide reaches the ends 42 of the rods, it will be exposed directly to the flame, which will produce the desired nuclei, apparently through something akin to normal vaporization, although undoubtedly different. Thus, when silver iodide powder was placed in the crucible without the capillary rods R therein, the molten pool or button of silver iodide eventually evaporated or disappeared, but without producing the desired nuclei to any great extent. It was also found that, at times, a small bead of silver lay in the bottom of the crucible but without any silver iodide nuclei being produced, as indicated by the flame color or the cold steel bar test described below. When purple crystals of iodine were added to the silver in crucible, the iodine reacted with the silver to produce additional silver iodide, indicated by an immediate resumption of the production of silver iodide nuclei. In this way, all of the residual silver was used up.

Certain significant tests have been carried out in connection with the silver iodide nuclei generator of this invention. One test comprised placing a cold piece of round or flat steel over the flame a few inches above shell 30. It was observed that a greenish coating of silver iodide nuclei condensed on the cold steel, such coating being heavier directly above the rods and thinner in between. It was also observed that when the flame entering the lower end of the shell 30 was blue in color, the flame discharged from the upper end of shell 30 was bright blue-green in color, with a noticeable division in the flame between the areas above the rods and in between, as long as any silver iodide remained in the crucible.

Cold chamber tests were also made. The cold chamber is a dark lined box, open at the top, but maintained at a subzero temperature, with microscope slides placed in the bottom. When the operator blew his breath into the chamber, a fog was observed. A syringe full of product was drawn from the flames discharged from the shell 30 and injected into the cold chamber. When a breath was blown into the cold chamber, the particles of moisture condensing on nuclei became visible under a flash light beam as floating, glittering specks, in this test the light beam showing what appeared as a solid column of glittering quartz. With additional breaths, the moisture condensing on the nuclei became heavier and fell onto the microscope slides. When the slides were placed under a microscope in an adjoining cold chamber and the miniature snowflakes or ice crystals counted, it was calculated that each gram of silver iodide vaporized in the generator of this invention produced $7 \times 10^{14}$ nuclei.

The material of which the rods R and R' are made is preferably one which is not normally subject to corrosion or rusting at the temperatures involved. Thus, Monel metal, a nickel and copper alloy, has been found to be a suitable metal, while Inconel, a nickel and chromium alloy, and stainless steel, a nickel and steel alloy, are other suitable materials. Carbon steel rods were found to have a tendency to become oxidized and, upon removal and cooling, the silver iodide film, referred to previously, was not evident over the oxidized areas, thus indicating a decrease in the carrying capacity of such rods. Thus, if carbon steel rods are used, they should be polished frequently, to remove oxidized surface areas. The size of the rods may be varied considerably, while the rods shown and described are merely one example of rod means, which may be wires or filaments, utilized individually or twisted together or woven as a loose mesh, with the ends or edge overhanging the upper end of the crucible. The crucible 35 is preferably formed of ceramic or other high temperature resistant material.

From the foregoing, it will be evident that this invention fulfills to a marked degree the requirements and objects hereinbefore set forth. Through the use of a rod means overhanging the upper rim of the crucible, the production of silver iodide nuclei is greatly enhanced. Through the use of a shell which not only supports the crucible, but also provides a passage for heating the crucible and drawing the flames or hot gases toward the ends of the rod means, as well as having a venturi section, the flames or hot gases are directed more actively toward the ends of the rod means. Through the use of a burner to which oxygen may be supplied, the temperature of the flames or hot gases may be increased considerably, while the use of a housing wall enclosing the generator enables the apparatus to be used more effectively under adverse weather conditions. If desired, of course, a shield to protect the burner from a cross wind may be mounted on the apparatus, as by being attached to one or more of supporting legs 15.

Although a preferred embodiment and certain variations thereof have been illustrated and described, it will be understood that other embodiments may exist and that other changes may be made, all without departing from the spirit and scope of this invention, as defined in the appended claims.

What is claimed is:

1. In a silver iodide nuclei generator:
   an upright crucible having an upper rim and containing silver iodide in the bottom thereof; and
   a series of rod means within the crucible extending from said bottom of said crucible to the upper rim of said crucible and bent at the rim to extend outwardly from said upper rim; and combustive heating means to melt the silver iodide.

2. In a silver iodide nuclei generator as defined in claim 1, wherein said rod means comprises:
   a series of individual rods, at least two of said rods being connected together at the bottom as a dual rod, and each united pair having its joined end in the bottom of said crucible.

3. In a silver iodide nuclei generator as defined in claim 2, wherein said rod means comprises:
   a pair of dual rods, each pair having a rounded lower end, the vertical planes of the dual rods being generally transverse to each other.

4. In a silver iodide nuclei generator as defined in claim 3, wherein:
   one dual rod has a rounded base; and the other one dual rod has a sinuous base adapted to overlie the base of said one dual rod and lower points adapted to be disposed on opposite sides of said base of said one dual rod.

5. Apparatus for generating silver iodide nuclei, comprising:
   a crucible having an upper rim and adapted to contain silver iodide in the bottom thereof;
   a series of rod means extending from said bottom of said crucible to the upper rim of said crucible and having ends extending outwardly from said upper rim;
   an upright shell surrounding said crucible and provided with means for supporting said crucible in upright position within said shell; and
   means for producing and directing heating flames or hot gases upwardly into the lower end of said shell, said flames or hot gases having a temperature sufficient to melt the silver iodide contained in the bottom of said crucible and passing between said shell and crucible to move past said outwardly extending ends of said rod means.

6. Apparatus for generating silver iodide nuclei, as defined in claim 5, wherein said means for producing heating flames includes:
   an upright fuel gas nozzle adapted to be connected to a supply of fuel gas;
   an upright inner tube surrounding said fuel as gas nozzle and provided with apertures in its lower end adjacent said nozzle; and
   a hollow ring surrounding said burner tube opposite said apertures and having a series of holes on the inside thereof for discharging oxygen supplied to said ring into said apertures, along with air supplied through said apertures.

7. Apparatus for generating silver iodide nuclei, as defined in claim 5, wherein:
   said shell is supported by an inner ring above said means for producing heating flames;
   an open ended housing is disposed in spaced relation to and surrounding said shell; and
   means for supporting said inner ring and said shell extends from below said flame producing means to above said flame producing means.

8. Apparatus for generating silver iodide nuclei, as defined in claim 5, wherein:
   said shell has a larger inside diameter at the upper and lower ends, said diameter decreasing from each end toward the point of least diameter at approximately the center; and
   said means for supporting said crucible is disposed at least adjacent the point of least diameter of said shell.

9. Apparatus for generating silver iodide nuclei, as defined in claim 8, wherein:
   said supporting means for said crucible comprises a series of spaced lugs extending inwardly from the inside of said shell and having inclined inner edges for engaging said crucible.

10. A method of generating silver iodide nuclei, which comprises:
    applying heated gases to the lower end of a crucible containing silver iodide in the bottom thereof, said heated gases having a temperature sufficient to cause said silver iodide to melt; and
    causing said heated gases to move along the sides of said crucible and past the overhanging ends of a series of rod means extending from the bottom of said crucible to the rim thereof and having ends overhanging said rim; and restricting the path of said hot gases adjacent the rim of said crucible so as to increase the velocity thereof.

11. A method of generating silver iodide nuclei, as defined in claim 10, including:
supplying a fuel gas, air and oxygen to form said heating flames.

12. A method of generating silver iodide nuclei, as defined in claim 10, including:
adding iodine to silver remaining in said crucible.

References Cited

UNITED STATES PATENTS

| 131,075 | 9/1872 | Andrews | 21—108 X |
| 2,850,615 | 9/1928 | Luse et al. | 252—359 |

FOREIGN PATENTS

| 736,416 | 5/1943 | Germany. |
| 641,290 | 6/1957 | Italy. |

NORMAN YUDKOFF, Primary Examiner.

J. SOFER, Assistant Examiner.